(12) United States Patent
Harada (10) Patent No.: US 12,342,226 B2
(45) Date of Patent: Jun. 24, 2025

(54) TERMINAL AND COMMUNICATION METHOD

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 332 days.

(21) Appl. No.: 17/796,983

(22) PCT Filed: Feb. 2, 2021

(86) PCT No.: PCT/JP2021/003751
§ 371 (c)(1),
(2) Date: Aug. 2, 2022

(87) PCT Pub. No.: WO2021/171932
PCT Pub. Date: Sep. 2, 2021

(65) Prior Publication Data
US 2023/0345314 A1    Oct. 26, 2023

(30) Foreign Application Priority Data
Feb. 27, 2020  (JP) .................................. 2020-031839

(51) Int. Cl.
*H04W 36/00* (2009.01)
*H04W 48/12* (2009.01)
*H04W 52/02* (2009.01)

(52) U.S. Cl.
CPC ....... *H04W 36/0069* (2018.08); *H04W 48/12* (2013.01); *H04W 52/0206* (2013.01)

(58) Field of Classification Search
CPC . H04W 16/32; H04W 36/0069; H04W 48/12; H04W 52/0206; H04W 72/04
See application file for complete search history.

(56) References Cited

U.S. PATENT DOCUMENTS

| | | | | |
|---|---|---|---|---|
| 10,574,515 B2* | 2/2020 | Kim | .................. | H04L 5/001 |
| 10,887,800 B2* | 1/2021 | Ang | .................. | H04L 5/001 |
| 2019/0124558 A1* | 4/2019 | Ang | .................. | H04L 5/001 |
| 2020/0204312 A1* | 6/2020 | Xu | .................. | H04W 36/085 |
| 2021/0029772 A1* | 1/2021 | Islam | .................. | H04L 1/1896 |
| 2021/0051640 A1* | 2/2021 | Pao | .................. | H04W 72/044 |

(Continued)

OTHER PUBLICATIONS

3GPP TS 38.212 V16.0.0, "3rd Generation Partnership Project; Technical Specification Group Radio Access Network; NR; Multiplexing and channel coding (Release 16)" Dec. 2019 (145 pages).

(Continued)

*Primary Examiner* — Alpus Hsu
(74) *Attorney, Agent, or Firm* — Osha Bergman Watanabe & Burton LLP (57) ABSTRACT

A terminal includes a receiving unit that receives a configuration on dormancy of one or more secondary cells from a base station through higher layer signaling, and that receives control information including a notification related to dormancy through a physical layer; and a control unit that transitions a secondary cell group configured by the configuration to a dormant state or a non-dormant state on a per secondary cell group basis, based on a specific field included in the control information.

3 Claims, 6 Drawing Sheets

(56) References Cited

U.S. PATENT DOCUMENTS

2021/0153116 A1* 5/2021 Damnjanovic ... H04W 52/0206

OTHER PUBLICATIONS

3GPP TS 38.300 V16.0.0, "3rd Generation Partnership Project; Technical Specification Group Radio Access Network; NR; NR and NG-RAN Overall Description; Stage 2 (Release 16)" Dec. 2019 (101 pages).
ZTE Corporation, "Remaining Issues on Fast SCell Activation", 3GPP TSG RAN WG1 Meeting #100, R1-2000363, e-Meeting, Feb. 24-Mar. 6, 2020 (4 pages).
International Search Report issued in Application No. PCT/JP2021/003751 mailed on May 11, 2021 (4 pages).
Written Opinion issued in Application No. PCT/JP2021/003751 mailed on May 11, 2021 (4 pages).

* cited by examiner

TERMINAL AND COMMUNICATION METHOD

TECHNICAL FIELD

The present invention relates to a terminal and a communication method in a radio communication system.

BACKGROUND ART

In New Radio (NR) (which is also referred to as "5G") that is a successor system to Long Term Evolution (LTE), technology has been studied (e.g., Non-Patent Document 1) that meets the requirements, such as a requirement on large capacity system, a requirement on a high data transmission rate, a requirements on low latency, a requirement on simultaneous connection of multiple terminals, a requirement on low cost, and a requirement on power saving.

In a work item of enhancing Multi-Radio Dual Connectivity (MR-DC)/Carrier Aggregation (CA) in NR Release 16, a secondary cell dormancy indication function has been supported (e.g., Non-Patent Document 2). For power saving purposes, during an active period of Discontinuous reception (DRX), dormancy or non-dormancy is indicated to a secondary cell or a secondary cell group using DCI. In a secondary cell to which dormancy is indicated, for example, a terminal does not execute monitoring of a Physical Downlink Control Channel (PDCCH).

RELATED ART DOCUMENT

Non-Patent Document

Non-Patent Document 1: 3GPP TS 38.300 V16.0.0 (2019 December)
Non-Patent Document 2: 3GPP TS 38.212 V16.0.0 (2019 December)

SUMMARY OF THE INVENTION

Problem to be Solved by the Invention

Dormancy of a secondary cell can be indicated by configuring a part of fields of DCI to be not for scheduling. However, if dormancy of a secondary cell is to be indicated by a configuration of a part of fields of DCI that is not for scheduling, a secondary cell to be in dormancy is unable to be flexibly specified based on the indication.

The present invention has been accomplished in view of the above-described point, and an object is to flexibly specify a cell to be transitioned to dormancy in a radio communication system.

Means for Solving the Problem

According to the disclosed technology, there is provided a terminal including a receiving unit that receives a configuration on dormancy of one or more secondary cells from a base station through higher layer signaling, and that receives control information including a notification related to dormancy through a physical layer; and a control unit that transitions a secondary cell group configured by the configuration to a dormant state or a non-dormant state on a per secondary cell group basis, based on a specific field included in the control information.

Advantage of the Invention

According to the disclosed technology, a cell to be transitioned to dormancy can be flexibly specified in a radio communication system.

EMBODIMENTS OF THE INVENTION

In the following, embodiments of the present invention are described by referring to the drawings. Note that the embodiments described below are an example, and embodiments to which the present invention is applied are not limited to the following embodiments.

In an operation of a radio communication system of an embodiment of the present invention, existing technology is appropriately used. Here, the existing technology is, for example, existing LTE but not limited to the existing LTE. Furthermore, the term "LTE" used in this specification has a broad meaning including LTE-Advanced and a system subsequent to LIE-Advanced (for example, NR), unless as otherwise specified.

In the embodiments of the present invention described below, terms used in the existing LTE are used, such as Synchronization signal (SS), Primary SS (PSS), Secondary SS (SSS), Physical broadcast channel (PBCH), Physical random access channel (PRACH), Physical Downlink Control Channel (PDCCH), Physical Downlink Shared Channel (PDSCH), Physical Uplink Control Channel (PUCCH), Physical Uplink Shared Channel (PUSCH), or the like. This is for convenience of description, and signals, functions, and the like, similar to these may be referred to by other names. The above-described terms in NR correspond to NR-SS, NR-PSS, NR-SSS, NR-PBCH, NR-PRACH, and the like. However, even if a signal is used for NR, the signal is not always specified as "NR-."

In the embodiments of the present invention, a duplex method may be a Time Division Duplex (TDD) method, an Frequency Division Duplex (FDD) method, or any other method (e.g., Flexible Duplex).

In the embodiments of the present invention, "configuring" a radio parameter, or the like, may be "pre-configuring"

a predetermined value, or configuring a radio parameter transmitted from a base station 10 or a terminal 20.

Figure 1:
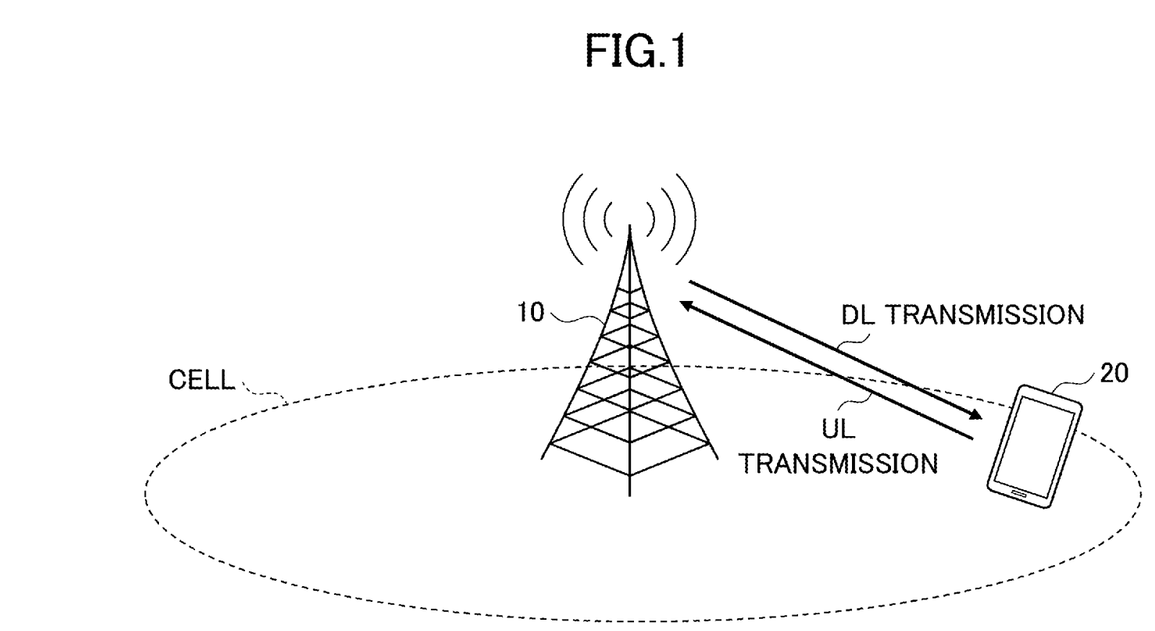
FIG. 1 is a diagram illustrating an example of a configuration of a radio communication system in an embodiment of the present invention.

FIG. 1 is a diagram illustrating an example of a configuration of a radio communication system according to an embodiment of the present invention. As illustrated in FIG. 1, the radio communication system according to the embodiment of the present invention includes a base station 10 and a terminal 20. In FIG. 1, one base station 10 and one terminal 20 are illustrated. However, this is an example, and there may be a plurality of base stations 10 and a plurality of terminals 20.

The base station 10 provides one or more cells, and the base station 10 is a communication device for performing radio communication with the terminal 20. A physical resource of a radio signal may be defined in a time domain and a frequency domain, the time domain may be defined in terms of a number of Orthogonal Frequency Division Multiplexing (OFDM) symbols, and the frequency domain may be defined in terms of a number of subcarriers or a number of resource blocks. The base station 10 transmits a synchronization signal and system information to the terminal 20. The synchronization signal is, for example, NR-PSS and NR-SSS. The system information is transmitted, for example, on a NR-PBCH, and the system information is also referred to as broadcast information. As illustrated in FIG. 1, the base station 10 transmits a control signal or data to the terminal 20 on Downlink (DL), and the base station 10 receives a control signal or data from the terminal 20 on Uplink (UL). Each of the base station 10 and the terminal 20 can transmit and receive signals by performing beamforming. Furthermore, the base station 10 and the terminal 20 can apply Multiple Input Multiple Output (MIMO) based communication to DL or UL. Furthermore, the base station 10 and the terminal 20 may perform communication through a secondary cell (SCell: Secondary Cell) and a primary cell (PCell: Primary Cell) that are configured based on Carrier Aggregation (CA). Furthermore, the terminal 20 may perform communication through a primary cell of the base station 10 and a primary secondary cell (PSCell: Primary Secondary Cell) of another base station 10 that are configured based on Dual Connectivity (DC).

The terminal 20 is a communication device provided with a radio communication function, such as a smartphone, a cellular phone, a tablet, a wearable terminal, or a communication module for M2M (Machine-to-Machine). As illustrated in FIG. 1, the terminal 20 utilizes various communication services provided by a radio communication system by receiving control signals or data in DL from the base station 10 and transmitting control signals or data in UL to the base station 10.

Here, for NR CA or LTE CA, a state of a secondary cell is defined. In an active state, control signals are monitored, data is transmitted and received, control signals are transmitted and received, and, as related operations, a Channel State Information (CSI) measurement, CSI reporting, and the like are performed. In a deactivated state, monitoring of a control signal, transmission and reception of data, and transmission and reception of a control signal are not performed, and a CSI measurement, CSI reporting, and the like are not performed.

Furthermore, in NR or LTE, in addition to the above-described active state and deactivated state, a dormant state is specified, as a state of a secondary cell. In a dormant state, monitoring of a control signal, transmission and reception of data, and transmission and reception of a control signal are not performed. However, in the dormant state, a CSI measurement and CSI reporting are performed.

When the state of a secondary cell transitions from a deactivated state to an active state, a CSI measurement and CSI reporting are to be performed after completion of the transition. Accordingly, it takes time to start communication after completion of the transition, and latency is increased. If a dormant state is introduced, latency for completing transition to an active state can be reduced by transitioning to a dormant state prior to transitioning to an active state.

Furthermore, a Bandwidth Part (BWP) has been introduced in NR. By applying a BWP, a frequency band for a UE to perform monitoring of control signals, transmission and reception of data, and transmission and reception of control signals can be changed within a CC. Additionally, by configuring different sets of parameters for BWPs, a parameter set can be changed quickly. Here, for changing a BWP, it is not mandatory to change a frequency band. For example, two BWPs may be prepared for which different values of a parameter related to power consumption reduction are configured. The parameter related to the power consumption reduction can be changed by changing one BWP to the other BWP. For example, configurations may be prepared, such as an active BWP with normal power consumption, and a dormant BWP with power consumption that is less than the normal power consumption.

For example, for changing a BWP, an operation is assumed in which a narrow-band BWP is to be used when there is no data to be transmitted and received (i.e., only monitoring of a control signal is performed) and/or when traffic is small, and a wideband BWP is to be used for a case other than the above-described case.

Furthermore, in NR release 16, a secondary cell dormancy indication function has been supported for the Multi-Radio Dual Connectivity (MR-DC)/Carrier Aggregation (CA) enhancement work item. During an active period of Discontinuous reception (DRX), dormancy or non-dormancy is indicated to a secondary cell or a secondary cell group using Downlink control information (DCI). In a secondary cell to which the dormancy is indicated, an active BWP is switched to a dormancy BWP. For example, in the secondary cell, a terminal does not execute monitoring of a Physical Downlink Control Channel (PDCCH).

Figure 2:
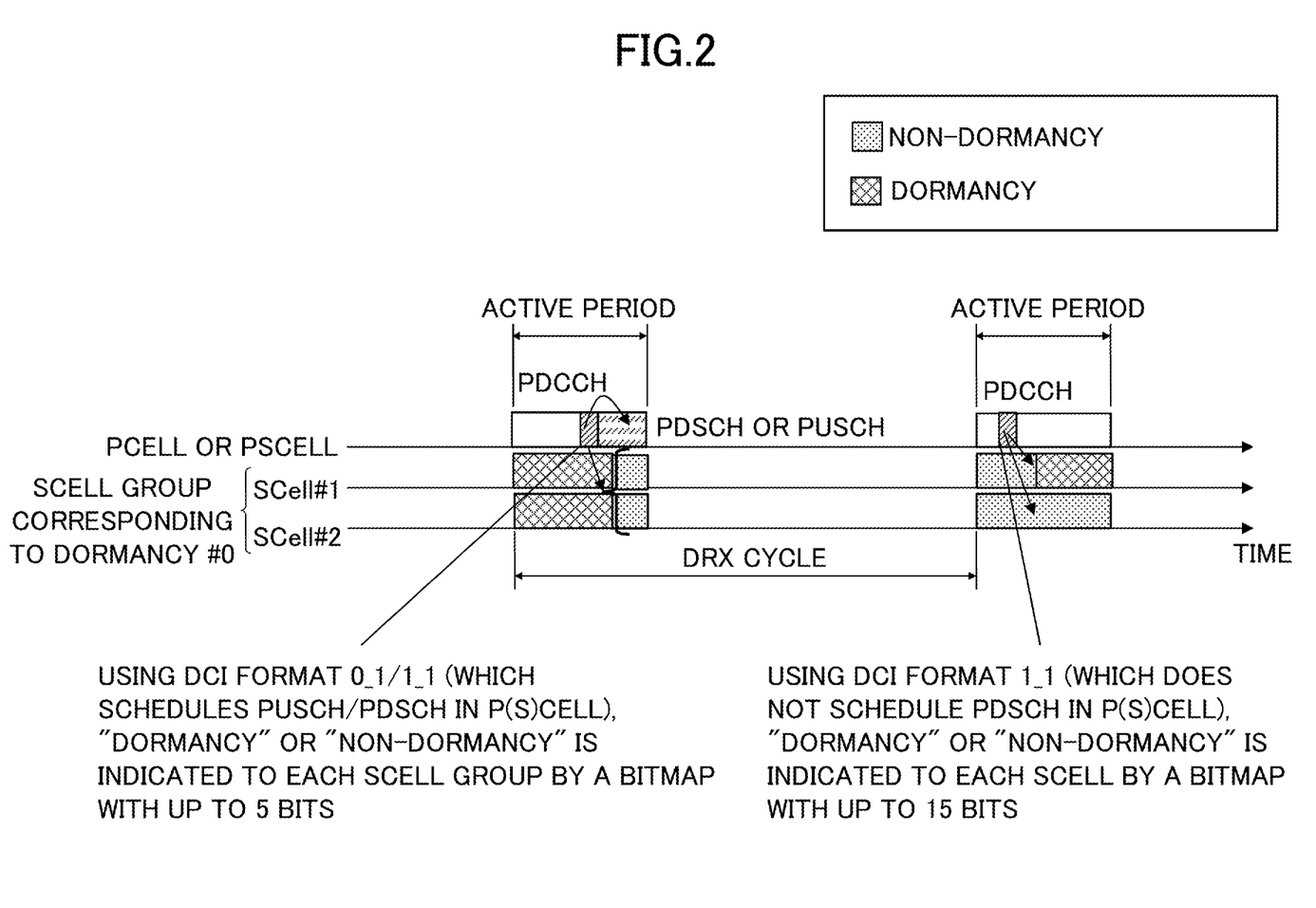
FIG. 2 is a diagram illustrating an operation on power saving.

FIG. 2 is a diagram for illustrating an operation related to power saving. As described above, in NR, a secondary cell can transition to a dormant state to reduce power consumption.

As illustrated in FIG. 2, during an active period of DRX, scheduling is performed using a DCI format 0_1 or a DCI format 1_1 on a primary cell or a primary secondary cell group, and, at the same time, dormancy or non-dormancy is indicated to each of preconfigured secondary cell groups using a bitmap of up to five bits. Namely, the base station can perform indication related to dormancy for up to five secondary cell groups.

Such an indication may be implemented by adding bit field(s) (0 bit to five bits) corresponding to a number of secondary cell groups to an existing DCI format 0_1 or DCI format 1_1. In FIG. 2, an example of an indication is illustrated that is for transitioning, from dormancy to non-dormancy, a secondary cell group "dormancy #0" formed of SCell #1 and SCell #2.

Furthermore, as illustrated in FIG. 2, during an active period of DRX, in a primary cell or a primary secondary cell group cell, a dormant state or a non-dormant state is indicated on a per secondary cell basis by a bitmap of up to 15 bits using a DCI format 1_1 without scheduling. Namely, for up to fifteen secondary cells, the base station can provide an indication on dormancy on a per secondary cell basis.

The indication may be implemented by mapping 5 bits of the field "Modulation and coding scheme (MCS)," 1 bit of "New data indicator (NDI)," 2 bits of "Redundancy version (RV)," 4 bits of "Hybrid automatic repeat request (HARQ) process number," 4 bits to 6 bits of "Antenna port," 0 bit or 1 bit of "Demodulation Reference Signal (DMRS) sequence initialization," and the like in the existing DCI format 1_1 onto indexes of the secondary cells. In FIG. 2, an example is illustrated in which SCell #1 is indicated to be transitioned from a non-dormant state to a dormant state, and SCell #2 is indicated to be remained in a dormant state.

Note that DCI format 1_1 without scheduling may imply that all the bits in a field indicating resource assignment in a frequency domain are set to 0 or 1.

Furthermore, in NR Release 16, a DCI format 0_2 and a DCI format 1_2 are newly supported in the work item of the enhanced Ultra-Reliable and Low Latency Communication (eURLLC). The DCI format 0_2 and the DCI format 1_2 have functions that are the same as those of the DCI format 0_1 and the DCI format 1_1. Furthermore, the DCI format 0_2 and the DCI format 1_2 are flexible in size, and the DCI format 0_2 and the DCI format 1_2 can implement, by a configuration by Radio Resource Control (RRC) signaling, DCI sizes that are smaller than those of the DCI format 0_1 and the DCI format 1_1. Currently, secondary cell dormancy using the DCI format 0_2 and the DCI format 1_2 is not supported.

In order to implement an indication on secondary cell dormancy in a case in which a DCI format 0_2 and the DCI format 1_2 are used for scheduling, a "SCell Dormancy indication field," i.e., bit field(s) (0 bit to 5 bits) corresponding to a number of secondary cell groups may be added to the DCI.

Whereas, for implementing an indication on secondary cell dormancy in a case in which a DCI format 1_2 is used without scheduling, the methods indicated in the following A)-D) can be considered.

A) For example, a definition of fields of the DCI format 1_2 may be changed from that of the DCI format 1_1 as follows.

The 2 bits of "RV" may be changed to any bit from 0 bit to 2 bits. The 4 bits of the "HARQ process number" may be changed to any bit from 0 bit to 4 bits. The 4 bits of the "Antenna port" may be changed to any bit among 0, 4, 5, and 6 bits. The "SRS request" may be any bit among 0, 2, and 3 bits.

Note that, in the DCI format 1_2, the field of up to five bits in the DCI format 1_1 for indicating dormancy may be used as it is. Furthermore, the TPC command field and the SRS request field may be used for indicating dormancy.

B) If a size of concatenated fields used for an indication on secondary cell dormancy using the DCI format 1_2 without scheduling is less than bits, the base station 10 may limit the indication on the secondary cell dormancy to a number of cells that can be indicated by the concatenated fields.

C) The base station 10 may be set a size of concatenated fields used for an indication on secondary cell dormancy using the DCI format 1_2 without scheduling to be greater than or equal to 15 bits.

D) The fields used for an indication on secondary cell dormancy using the DCI format 1_2 without scheduling may be concatenated in the following order:

1) BWP indicator (Bandwidth part indicator);
2) Virtual Resource Block (VRB)-to-Physical Resource Block (PRB) mapping;
3) PRB bundling size indicator;
4) Rate matching indicator;
5) Zero-power Channel State Information-Reference Signal trigger (ZP CSI-RS trigger); and
6) Transmission configuration indication.

For the above-described A), there is a case in which a field used for an indication on secondary cell dormancy is less than 15 bits that is a number of secondary cells. Furthermore, it is not preferable that interpretation of the bits in the fields be different from that of DCI format 1_1.

Furthermore, in the above-described B), there is a case in which a size of the field used for an indication on secondary cell dormancy is less than 15 bits that is a number of secondary cells. In this case, the indication on dormancy can be made only to a part of the secondary cells. To the other secondary cells, an indication on dormancy without scheduling is unable to be made.

For the above-described C), if the size of each field of the DCI format 1_2 is enlarged, the advantage of the compactness of the DCI format 1_2 is lost.

In the above-described D, it is not preferable that interpretation of the bits in the fields be different from that of DCI format 1_1.

Accordingly, an indication on secondary cell dormancy using the DCI format 1_2 without scheduling may be preconfigured using RRC signaling.

Figure 3:
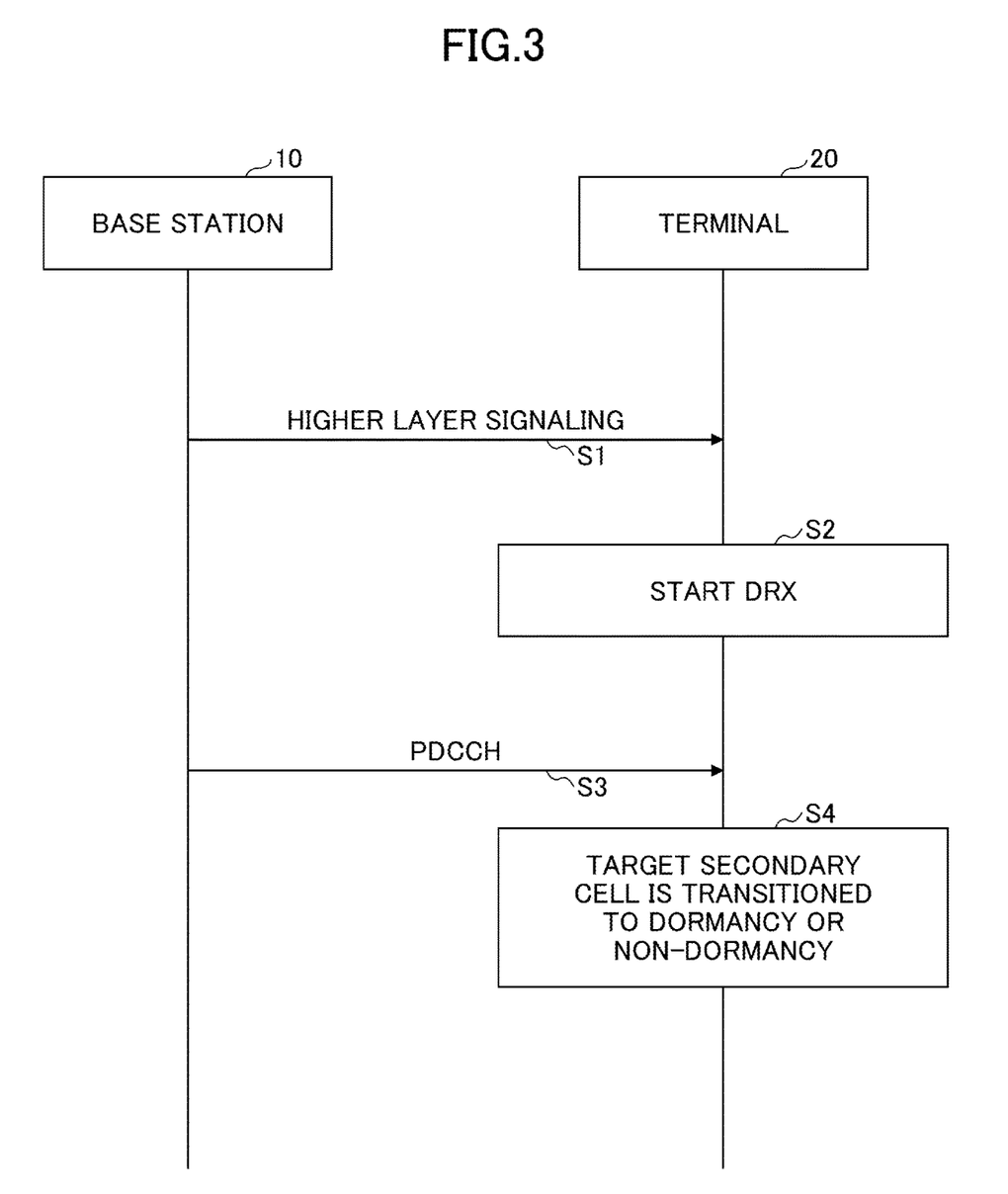
FIG. 3 is a sequence diagram illustrating an example of an operation on dormancy in an embodiment of the present invention.

FIG. 3 is a sequence diagram illustrating an example of an operation on dormancy in an embodiment of the present invention. At step S1, the base station 10 transmits higher layer signaling to the terminal 20. The higher layer signaling may be RRC signaling or signaling using Medium Access Control-Control Element (MAC-CE). The higher layer signaling may include a configuration for an indication on secondary cell dormancy for a case in which the DCI format 1_2 is used without scheduling. Furthermore, the higher layer signaling may include a configuration for an indication on secondary cell dormancy for a case in which the DCI format 1_2 is used with scheduling. The higher layer signaling may include a configuration on DRX.

At step S2, the terminal starts DRX. The DRX may be DRX in an RRC connected (RRC CONNECTED) state; DRX in an RRC inactive (RRC INACTIVE) state; or DRX in an RRC idle (RRC IDLE).

At step S3, the base station 10 transmits a PDCCH to the terminal 20 through a physical layer. The PDCCH may include, at least, a DCI format 1_2. Subsequently, the terminal 20 transitions, based on the PDCCH, a target secondary cell to a dormant state or a non-dormant state.

Figure 4:
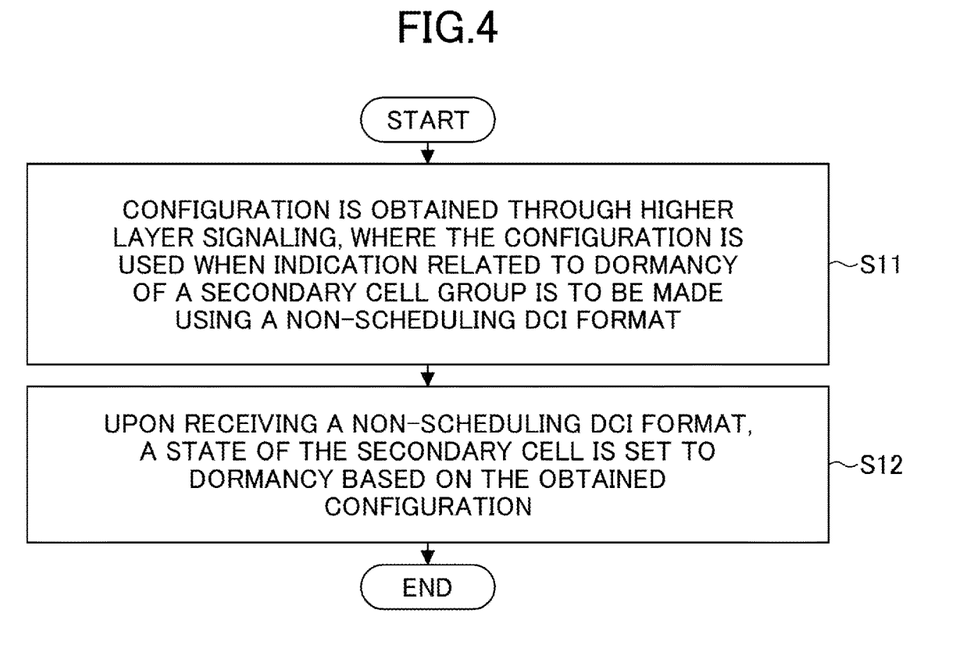
FIG. 4 is a flowchart for illustrating an example (1) of an operation on dormancy in an embodiment of the present invention.

FIG. 4 is a flowchart for illustrating an example (2) of an operation on dormancy in an embodiment of the present invention. Using the flow chart illustrated in FIG. 4, an example of detailed operations of steps S1 and S3 in the sequence diagram illustrated in FIG. 3 is described.

At step S11, the terminal 20 obtains, through higher layer signaling, a configuration used for a case in which an indication on dormancy is made to secondary cell groups using a DCI format without scheduling. The DCI format may be the DCI format 1_2. By the configuration, one or more secondary cell groups may be configured. A number of the secondary cell groups configured by the configuration may be up to 15. Note that a secondary cell group is a set of one or more secondary cells.

At step S12, in response to receiving the DCI format not for scheduling, the terminal 20 configure dormancy of a secondary cell, based on the configuration obtained at step S11. For example, the DCI format may be the DCI format 1_2, and the DCI format may configure dormancy of each secondary cell group using bits obtained by concatenating the fields indicated in 1)-6) below.
1) "Modulation and coding scheme (MCS)"
2) "New data indicator (NDI)"
3) "Redundancy version (RV)"
4) "HARQ process number"
5) "Antenna ports"
6) "DMRS sequence initialization"

Note that, in addition to the above-described fields for configuring dormancy of each secondary cell group, the dormancy of each secondary cell group may be configured by further using a "SCell dormancy indication" field used for scheduling in which the DCI format 0_2 and the DCI format 1_2 are used.

By configuring dormancy of a secondary cell by the method illustrated in FIG. 4, dormancy of as many secondary cells as possible can be controlled without changing the fields of the DCI format 1_2 from those of the DCI format 1_1. Furthermore, it is not necessary to increase the size of the DCI format 1_2.

Figure 5:
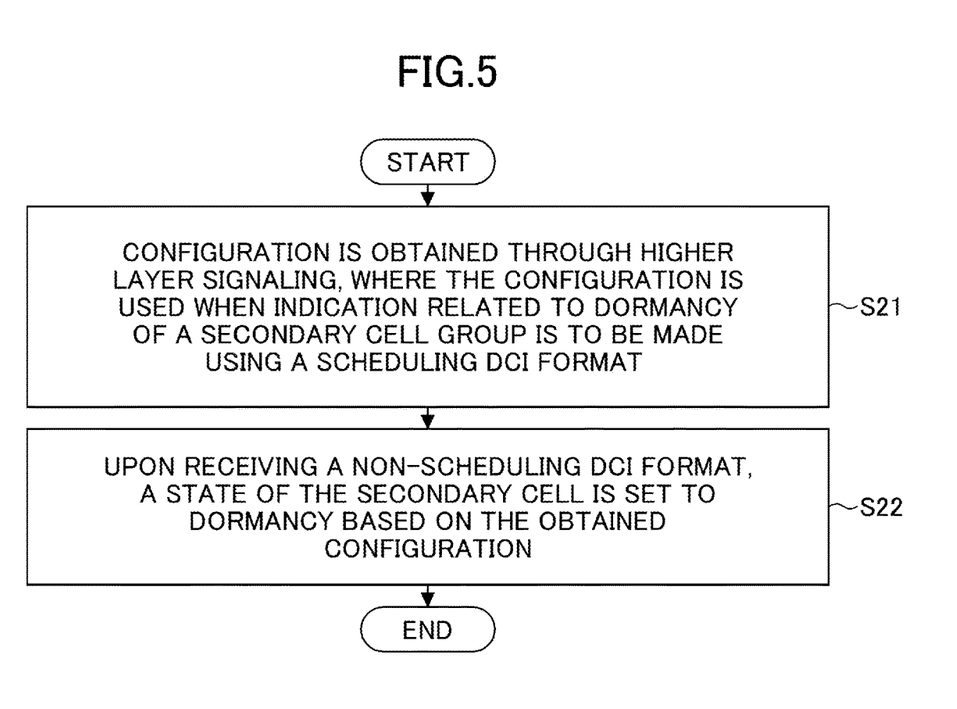
FIG. 5 is a flowchart for illustrating an example (2) of an operation on dormancy in an embodiment of the present invention.

FIG. 5 is a flowchart for illustrating an example (2) of an operation on dormancy in an embodiment of the present invention. Using the flowchart illustrated in FIG. 5, another example of detailed operations of steps S1 and S3 in the sequence diagram illustrated in FIG. 3 is described.

At step S21, the terminal 20 obtains, through higher layer signaling, a configuration used for a case in which an indication on dormancy is made to secondary cell groups using a DCI format for scheduling. The DCI format may be the DCI format 1_2. By the configuration, one or more secondary groups may be configured. The maximum number of the secondary cell groups configured by the configuration may be five. Note that a secondary cell group is a set of one or more secondary cells.

The obtained configuration is a configuration for making an indication on dormancy to secondary cell groups where the configuration is applied to a DCI format for scheduling. However, as illustrated in step S22, the obtained configuration may further be applied to a DCI format not for scheduling.

At step S22, in response to receiving the DCI format not for scheduling, the terminal 20 configures, based on the configuration obtained at step S21, dormancy of a secondary cell. For example, the DCI format may be the DCI format 1_2, and the DCI format may configure dormancy of each secondary cell group using up to the first five bits among the bits obtained by concatenating the fields indicated in 1)-6) below.
1) "Modulation and coding scheme (MCS)"
2) "New data indicator (NDI)"
3) "Redundancy version (RV)"
4) "HARQ process number"
5) "Antenna ports"
6) "DMRS sequence initialization"

Note that, in addition to the above-described fields for configuring dormancy of each secondary cell group, the dormancy of each secondary cell group may be configured by further using a "SCell dormancy indication" field used for scheduling using the DCI format 0_2 and the DCI format 1_2.

Note that step S22 may be executed if a number of secondary cells is greater than a number of bits obtained by concatenating the fields described in 1)-6) above, or if the number of the secondary cells is greater than a number of bits obtained by concatenating the fields described 1)-6) above and the "SCell dormancy indication" field. Namely, step S12 illustrated in FIG. 4 may be executed if a number of secondary cells does not exceed a number of bits obtained by concatenating the fields described in 1)-6) above, or if the number of the secondary cells does not exceeds a number of bits obtained by concatenating the fields described 1)-6) above and the "SCell dormancy indication" field. Here, a number of secondary cells may be a number of secondary cells for which dormancy BWPs are configured. Furthermore, for comparing a number of secondary cells for which dormancy BWPs are configured with a number of bits obtained by concatenating the above-described fields, the bits to be used may correspond to indexes, in ascending order, of only the secondary cells for which the dormancy BWPs are configured, without defining correspondence between the bits to be used and the indexes of the secondary cells in ascending order.

Note that the number of the secondary cell groups is not limited to 5. The number of the secondary cell groups may be greater than 5. Dormancy of secondary cell groups may be configured using five or more first bits in the bits obtained by concatenating the above-described fields.

By configuring dormancy of secondary cells using the method illustrated in FIG. 5, dormancy of secondary cell groups can be controlled by applying a configuration for a case of scheduling to a case of not scheduling, without requiring new higher layer signaling. Furthermore, the size of the DCI format 1_2 need not be increased.

By the above-described embodiments, the base station 10 can efficiently and flexibly transmit, on a per secondary cell basis or on a secondary cell group basis, an indication on dormancy to the terminal 20, based on a configuration by higher layer signaling.

Namely, in a radio communication system, a cell to be transitioned to dormancy can be flexibly specified.

(Device Configurations)

Next, examples of functional configurations of the base station 10 and the terminal 20 for executing the above-described processing and operation are described. The base station 10 and the terminal 20 include functions for executing the above-described embodiments. However, each of the base station 10 and the terminal 20 may only provide with a part of the functions in the embodiments.

<Base Station 10>

Figure 6:
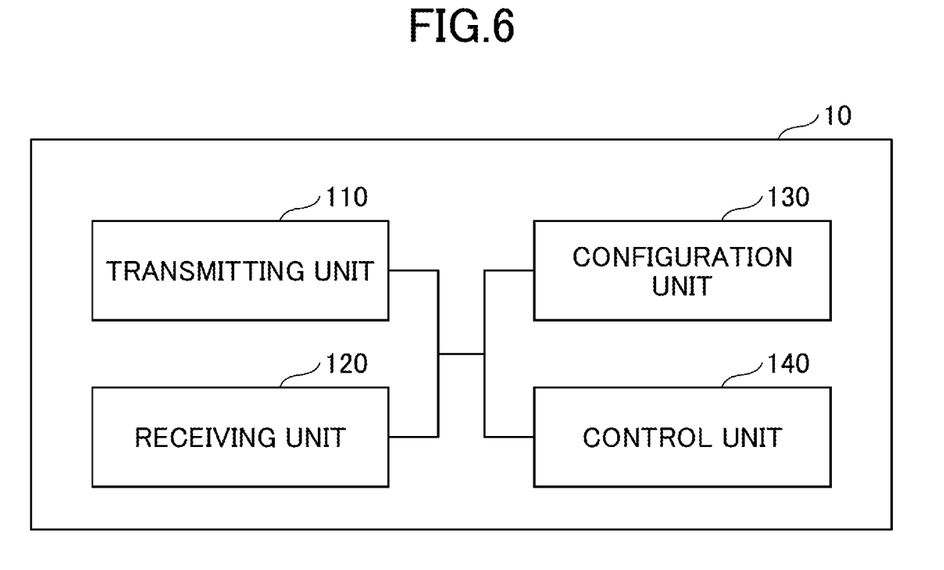
FIG. 6 is a diagram illustrating an example of a functional configuration of a base station 10 according to an embodiment of the present invention.

FIG. 6 is a diagram illustrating an example of a functional configuration of the base station 10 in an embodiment of the present invention. As illustrated in FIG. 6, the base station 10 includes a transmitting unit 110; a receiving unit 120; a configuration unit 130; and a control unit 140. The functional configuration illustrated in FIG. 6 is merely an example. Functional division and names of functional units may be any division and names, provided that operation according to the embodiments of the present invention can be executed.

The transmitting unit 110 includes a function for generating a signal to be transmitted to the terminal 20 and transmitting the signal through radio. The transmitting unit 110 transmits an inter network node message to another network node. The receiving unit 120 includes a function for receiving various signals transmitted from the terminal 20 and retrieving, for example, information of a higher layer from the received signals. The transmitting unit 110 has a function to transmit NR-PSS, NR-SSS, NR-PBCH, DL/UL control signals, and the like, to the terminal 20. The receiving unit 120 receives an inter network node message from another network node.

The configuration unit 130 stores preconfigured configuration information and various types of configuration information to be transmitted to the terminal 20. Content of the configuration information is, for example, a BWP configuration of the terminal 20; a configuration of a power saving signal or a power saving channel; a configuration on dormancy of a secondary cell; and the like.

As described in the embodiments, the control unit 140 performs control on a secondary cell, a BWP, and transmission of a power saving signal. A functional unit related to signal transmission in the control unit 140 may be included in the transmitting unit 110, and a functional unit related to signal reception in the control unit 140 may be included in the receiving unit 120.

<Terminal 20>

Figure 7:
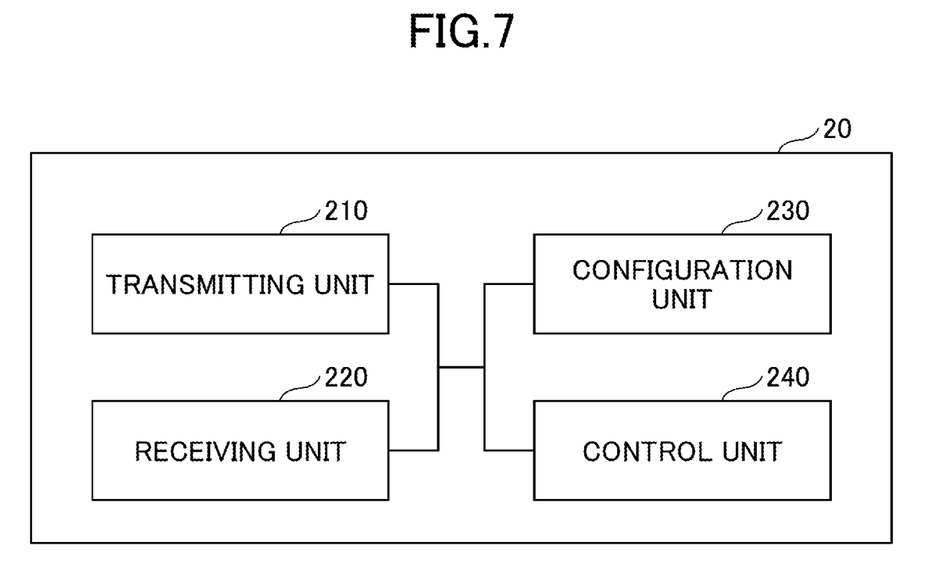
FIG. 7 is a diagram illustrating an example of a functional configuration of a terminal 20 according to an embodiment of the present invention.

FIG. 7 is a diagram illustrating an example of a functional configuration of a terminal 20 according to an embodiment of the present invention. As illustrated in FIG. 7, the terminal 20 includes a transmitting unit 210; a receiving unit 220; a configuration unit 230; and a control unit 240. The functional configuration illustrated in FIG. 7 is only one example. The functional division and the names of the names of the functional units may be any division and names, provided that operations of the embodiments of the present invention can be executed.

The transmitting unit 210 creates a transmission signal from transmission data and transmits the transmission signal through radio. The receiving unit 220 receives various signals through radio and retrieves higher layer signals from the received physical layer signals. The receiving unit 220 has a function to receive NR-PSS, NR-SSS, NR-PBCH, DL/UL/SL control signals, or the like, transmitted from the base station 10. For example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), or the like to another terminal 20 as D2D communication, and the receiving unit 220 receives PSCCH, PSSCH, PSDCH, PSBCH, or the like from another terminal 20.

The configuration unit 230 stores various types of configuration information received from the base station 10 by the receiving unit 220. The configuration unit 230 also stores preconfigured configuration information. The content of the configuration information is, for example, a BWP configuration of the terminal 20, a configuration on a power saving signal or a power saving channel, a configuration on dormancy of a secondary cell, and the like.

As described in the embodiments, the control unit 240 performs control on a secondary cell, a BWP, and transmission of a power saving signal. A functional unit related to signal transmission in the control unit 240 may be included in the transmitting unit 210, and a functional unit related to signal reception in the control unit 240 may be included in the receiving unit 220.

(Hardware Configuration)

The block diagrams (FIG. 6 to FIG. 7) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 8:
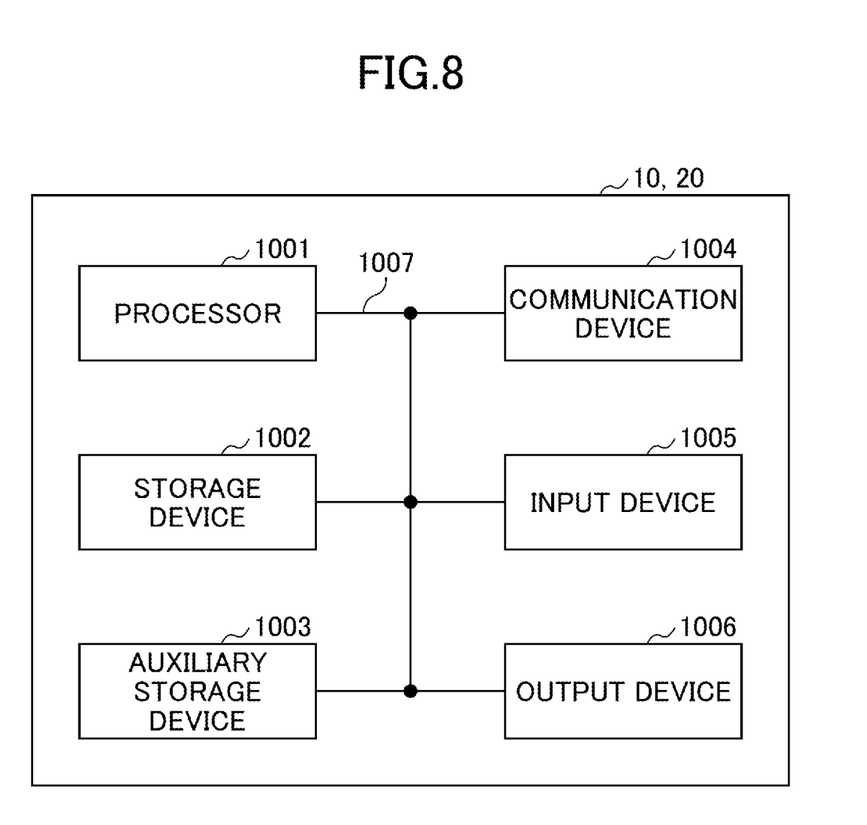
FIG. 8 is a diagram illustrating an example of a hardware configuration of the base station 10 or the terminal 20 according to an embodiment of the present invention.

For example, the base station 10, the terminal 20, or the like in an embodiment of the present invention may function as a computer for performing a process of radio communication method according to the present disclosure. FIG. 8 is a diagram illustrating an example of a hardware configuration of the base station 10 and the terminal 20 according to an embodiment of the present disclosure. Each of the base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the terminal 20 may be configured to include each device depicted, or may be configured without including some devices.

Each function in each of the base station and the terminal 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station 10 illustrated in FIG. 6 may be implemented by a control program which is stored in the storage device 1002 and operates on the processor 1001. Furthermore, for example, the control unit 240 of the terminal 20 illustrated in FIG. 7 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The devices such as the processor 1001 and the storage device 1002 are connected by the bus 1007 to communicate information with each other. The bus 1007 may be configured with a single bus or may be configured with different buses between the devices.

Furthermore, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these pieces of hardware.

Conclusion of the Embodiments

As described above, according to the embodiments of the present invention, there is provided a terminal including a receiving unit that receives a configuration on dormancy of one or more secondary cells from a base station through higher layer signaling, and that receives control information including a notification related to dormancy through a physical layer; and a control unit that transitions a secondary cell group configured by the configuration to a dormant state or a non-dormant state on a per secondary cell group basis, based on a specific field included in the control information.

According to the above-described configuration, the base station 10 can efficiently and flexibly transmits, on a per secondary cell basis or on a secondary cell group basis, an indication on dormancy to the terminal 20, based on a configuration by higher layer signaling. Namely, in a radio communication system, a cell to be transitioned to dormancy can be flexibly specified.

The control information need not be for scheduling. With this configuration, the terminal can efficiently and flexibly implement, on a per secondary cell basis, or on a per secondary cell group basis, a configuration on dormancy, based on the configuration by higher layer signaling.

The specific field may include at least one item of information selected from
1) Modulation and coding scheme (MCS);
2) New data indicator (NDI);
3) Redundancy version (RV);
4) Hybrid automatic repeat request (HARQ) process number;
5) Antenna port;
6) DMRS sequence initialization; and
7) Secondary cell dormancy indication. With this configuration, the terminal 20 can efficiently and flexibly implement, on a per secondary cell basis, or on a per secondary cell group basis, a configuration on dormancy, based on the configuration by higher layer signaling.

When a number of bits in the specific field exceeds a number of secondary cells that are subject to the configuration on dormancy, the control unit may use, as the configuration, a configuration on dormancy for one or more secondary cells, which is for scheduling. With this configuration, the terminal 20 can efficiently and flexibly implement, on a per secondary cell basis, or on a per secondary cell group basis, a configuration on dormancy, based on the configuration by higher layer signaling.

The number of the secondary cells that are subject to the configuration on dormancy may be a number of secondary cells for which dormant BWPs are configured. With this configuration, the terminal can efficiently and flexibly implement, on a per secondary cell basis, or on a per secondary cell group basis, a configuration on dormancy, based on the configuration by higher layer signaling.

Furthermore, according to an embodiment of the present invention, there is provided a communication method in which a terminal executes a reception procedure of receiving a configuration on dormancy for one or more secondary cells from a base station through higher layer signaling, and receiving control information including a notification related to dormancy through a physical layer; and a control procedure of transitioning a secondary cell group configured by the configuration to a dormant state or a non-dormant state on a per secondary cell group basis, based on a specific field included in the control information.

According to the above-described configuration, the base station 10 can efficiently and flexibly transmits, on a per secondary cell basis or on a secondary cell group basis, an indication on dormancy to the terminal 20, based on a configuration by higher layer signaling. Namely, in a radio communication system, a cell to be transitioned to dormancy can be flexibly specified.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 are described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the present disclosure and may be provided by any other method. For example, the notification of information may be given by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), NR (new Radio), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case is exemplified above in which there is one network node other than the base station 10. The one network node may be a combination of a plurality of other network nodes (e.g., MME and S-GW).

Information, a signal, or the like described in the present disclosure may be output from a higher layer (or a lower layer) to a lower layer (or a higher layer layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination in the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in the present disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station device," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the terminal is replaced with communication between a plurality of terminals 20 (for example, which may be referred to as device-to-device (D2D) or vehicle-to-everything (V2X)). In this case, the terminal 20 may have the functions of the base station 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal.

The term "determining" used in this specification may include a wide variety of actions. For example, "determining" may include, for example, events in which events such as judging, calculating, computing, processing, deriving, investigating, looking up, search, and inquiry (for example, looking up in a table, a database, or another data structure), or ascertaining are regarded as "determining." Further, "determining" may include, for example, events in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing are regarded as "determining." In other words, "determining" may include events in which a certain operation is regarded as "determining." Further, "determining" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

When "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 20) to each terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is provided, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Further, a long TTI (for example, a normal TTI, a subframe, or the like) may be replaced with a TTI having a time length exceeding 1 ms, and a short TTI (for example, a reduced TTI or the like) may be replaced with a TTI having a TTI length that is less than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Further, a time domain of an RB may include one or more symbols and may be a length of one slot, one mini slot, one subframe, or one TTI. One TTI, one subframe, or the like may be formed of one or more resource blocks.

Further, one or more RBs may be referred to as a physical resource block (PRB), a sub carrier group (SCG), a resource element group (REG), a PRB pair, an RB pair, or the like.

Further, the resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and the UE need not assume that predetermined signals/channels are transmitted and received outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted similarly to "different."

Each aspect/embodiment described in this specification may be used alone, in combination, or may be switched in accordance with the execution. Further, notification of predetermined information (for example, notification of "being X") is not limited to being performed explicitly, but may be performed by implicitly (for example, not notifying the predetermined information).

Note that, in the present disclosure, the DCI format 1_2 is an example of control information.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims.

Accordingly, the description of the present disclosure is for the purpose of illustration and does not have any restrictive meaning to the present disclosure.

This international patent application is based on and claims priority to Japanese Patent Application No. 2020-031839 filed on Feb. 27, 2020, and the entire content of Japanese Patent Application No. 2020-031839 is incorporated herein by reference.

LIST OF REFERENCE SYMBOLS 10 base station
110 transmitting unit
120 receiving unit
130 configuration unit
140 control unit
20 terminal
210 transmitting unit
220 receiving unit
230 configuration unit
240 control unit
1001 processor
1002 storage device
1003 auxiliary storage device
1004 communication device
1005 input device
1006 output device

The invention claimed is:

1. A terminal comprising:
a receiver that receives a configuration on dormancy of one or more secondary cells from a base station through higher layer signaling, and that receives control information including a notification related to dormancy through a physical layer; and
a processor that transitions a secondary cell group configured by the configuration to a dormant state or a non-dormant state on a per secondary cell group basis, based on a specific field included in the control information,
wherein the control information is not for scheduling,
wherein the specific field includes at least one item of information selected from:
Modulation and coding scheme (MCS);
New data indicator (NDI);
Redundancy version (RV);
Hybrid automatic repeat request (HARQ) process number;
Antenna port;
Demodulation Reference Signal (DMRS) sequence initialization; and
Secondary cell dormancy indication, and
wherein, when a number of bits in the specific field exceeds a number of secondary cells that are subject to the configuration on dormancy, the processor uses, as the configuration, a configuration on dormancy for one or more secondary cells, which is for scheduling.

2. The terminal according to claim 1, wherein the number of the secondary cells that are subject to the configuration on dormancy is a number of secondary cells for which dormant Bandwidth Part (BWPs) are configured.

3. A communication method in which a terminal executes:
receiving a configuration on dormancy for one or more secondary cells from a base station through higher layer signaling, and receiving control information including a notification related to dormancy through a physical layer; and
transitioning a secondary cell group configured by the configuration to a dormant state or a non-dormant state on a per secondary cell group basis, based on a specific field included in the control information,
wherein the control information is not for scheduling,
wherein the specific field includes at least one item of information selected from:
Modulation and coding scheme (MCS);
New data indicator (NDI);
Redundancy version (RV);
Hybrid automatic repeat request (HARQ) process number;
Antenna port;
Demodulation Reference Signal (DMRS) sequence initialization; and
Secondary cell dormancy indication, and
wherein, when a number of bits in the specific field exceeds a number of secondary cells that are subject to the configuration on dormancy, the terminal uses, as the configuration, a configuration on dormancy for one or more secondary cells, which is for scheduling.

* * * * *